Patented Jan. 3, 1939

2,142,265

UNITED STATES PATENT OFFICE 2,142,265

PROCESS OF MANUFACTURING CRYSTALLINE SUBSTANCES

Joseph Johannes Diekmann, Winschoten, Netherlands, assignor to Naamlooze Vennootschap: Chemische Fabriek "Gembo", Winschoten, Netherlands, a corporation of the Netherlands No Drawing. Application August 7, 1935, Serial No. 35,162. In the Netherlands August 8, 1934

7 Claims. (Cl. 23—110)

The invention relates to a process of manufacturing crystalline substances which comprises adding a solution of the substance to be crystallized, which is super-saturated at the temperature at which crystallization is carried out, to a solution of a substance promoting crystallization.

The invention is of particular value for manufacturing crystalline sodium silicate by adding a sodium silicate solution, which is super-saturated at the temperature at which crystallization is carried out, to a caustic soda solution.

The invention will be explained with regard to the manufacture of sodium silicate.

Although crystalline sodium silicate has been known for many years little attention has been paid to this product until the last few years. That this excellent alkaline substance for cleansing and washing purposes has not been used on a larger scale until quite recently must be ascribed to the fact that it is rather difficult to obtain a satisfactorily crystallized, dry and non-sticky product.

It is a well-known fact that an excess of alkali must be present for obtaining crystals of sodium silicate and that even in this case sodium silicate solutions have a very strong tendency to remain under-cooled. Moreover the behaviour of sodium silicate solutions in this respect is very irregular; it is not at all uncommon that in some cases a solution crystallizes spontaneously after some hours, whereas the same solution remains undercooled for six weeks and more in other cases without any apparent reason. Some under-cooled sodium silicate solutions crystallize immediately after being inoculated, whereas in other cases crystallization of the same solutions after inoculation is very slow and is only finished after e. g. half an hour, although the solution is vigorously agitated.

Another difficulty is caused by the fact that various hydrates of $Na_2SiO_3$ and of $Na_3HSiO_4$ can be obtained from solutions containing $Na_2O$ and $SiO_2$ by crystallization. It depends upon circumstances especially upon the sodium hydroxide concentration of the solution, which hydrate is separated. As the composition of the solution changes during crystallization generally two or more hydrates are formed from the same solution, which has an unfavourable effect on the crystallization process. It has appeared in the practice of this process that by cooling and agitating sodium silicate solutions, even if they contain a sufficient proportion of caustic soda, micro-crystalline, sticky products are obtained which can only be separated from the mother liquor with great difficulty and which are unsuitable for practical purposes.

In order to eliminate this drawback it has been proposed to cool the sodium silicate solution very slowly without agitating the same. In this way very large crystals may be produced from which a product suitable for practical purposes can be obtained by a comminuting process. This method, however, has the drawback that the crystallizing process is rather slow and that serious difficulties are encountered in comminuting the crystallized product which is often very hard. Moreover a product obtained by comminuting relatively large lumps has not the same beautiful appearance and the same degree of purity as a product which has been immediately obtained from a solution in crystals of the desired size.

According to the invention I add a sodium silicate solution, which is super-saturated at the temperature at which crystallization is effected, to a caustic soda solution of the desired concentration. I have found that in this case solid sodium silicate is obtained in the form of well developed crystals of a satisfactory size which can be easily separated from the solution. The crystalline product has about the appearance of sugar and can be easily distinguished from the prior products produced by comminuting large lumps. It is possible in this way to obtain very regular, rather large crystals.

It is generally advantageous to maintain the temperature during crystallization substantially constant. As the supersaturated sodium silicate solution generally has a higher temperature than the caustic soda solution in which the sodium silicate crystals are separted the last mentioned solution is preferably cooled in such a way that during crystallization a substantially uniform temperature is maintained.

According to a preferred embodiment of the invention the composition of the sodium silicate solution added is selected so as to be substantially the same as that of the hydrate separated from the solution. In this case the composition of the solution is not changed during the crystallizing process, with the result that during the whole process the same hydrate is produced and that crystallization is very uniform. If desired the sodium silicate solution can be diluted with a caustic soda solution of the same concentration as the liquid in which crystallization is effected. In this case the composition of the crystallizing liquid remains equally unaffected by the addition of the super-saturated sodium-silicate solution.

The crystals produced can be separated from the liquid continuously, e. g., by circulating the mixture of liquid and crystals through a settling-tank, a filtering press or a centrifugal apparatus. In this way an absolutely continuous process is created and the same caustic soda solution can be used for effecting a uniform crystallization of sodium silicate for quite a considerable period.

By controlling the concentration, especially of the caustic soda solution I am able to produce various hydrates of sodium silicate. If the sodium hydroxide concentration is less than 20–25% a hydrate of the formula Na₂SiO₃ 9 aq. is generally produced; if the said concentration is higher hydrates with less than 9 (e. g. 8, 6, 5 or 4) molecules of water are obtained. It is also possible to produce sodium-silicates in which the relative proportion of $Na_2O$ and $SiO_2$ is different from that in $Na_2SiO_3$.

In the caustic soda solution used a part of the hydroxide can be substituted by a soluble salt.

The invention can also be used for other manufacturing processes of crystalline products in which a substance affecting the crystallization is added, e. g. for manufacturing crystalline sodium carbonate. The process is preferably carried out by adding a solution having the composition of the desired hydrate (e. g. with 10 aq.) to a caustic soda solution which is agitated and maintained at a temperature suitable for crystallization.

Although the invention is particularly suitable for crystallizing substances from aqueous solutions I wish it to be understood that the invention is not limited to such solutions but can also be used for recovering crystalline substances from other solvents.

*Example 1*

A caustic soda solution of 20% is stirred and a solution containing 21.8% $Na_2O$ and 21.1% $SiO_2$ and having a temperature of about 60° C. is added. The caustic soda solution is maintained at a temperature of about 22° C. by cooling. After some time crystals appear which develop into a uniformly crystallized product which is separated from the liquid after well known methods and which has the formula $$Na_2SiO_3 9H_2O.$$

*Example 2*

A sodium silicate solution containing 21.8% $Na_2O$ and 21.1% $SiO_2$ is added in the same way as described in Example 1 to a solution containing 5% of sodium hydroxide and 15% of sodium chloride. The same hydrate ($Na_2SiO_3 9H_2O$) is obtained in the form of beautiful crystals.

I claim:

1. A method of producing crystalline sodium silicate comprising adding a hot sodium silicate solution at an initial temperature above crystallization temperature, which solution does not crystallize at said initial temperature but is supersaturated at crystallization temperature, to a sodium hydroxide solution at crystallization temperature, and maintaining the crystallization temperature in the mixture of sodium hydroxide solution and sodium silicate solution substantially constant, the relative proportions of sodium silicate solution and sodium hydroxide solution being such that the mixture is supersaturated with respect to the sodium silicate.

2. A method of producing crystalline sodium silicate comprising continuously adding a hot sodium silicate solution at an initial temperature above crystallization temperature, which solution does not crystallize at said initial temperature but is supersaturated at crystallization temperature, to a sodium hydroxide solution at crystallization temperature, and maintaining the crystallization temperature in the mixture of sodium hydroxide solution and sodium silicate solution substantially constant, the sodium silicate solution containing anhydrous sodium silicate and water in the same relative proportions as the crystalline substance produced, and the relative proportions of sodium silicate solution and sodium hydroxide solution being such that the mixture is supersaturated with respect to the sodium silicate.

3. A method of producing crystalline sodium silicate comprising continuously adding a hot sodium silicate solution at an initial temperature above crystallization temperature, which solution does not crystallize at said initial temperature but is supersaturated at crystallization temperature, to a continuously circulating sodium hydroxide solution at crystallization temperature and maintaining the crystallization temperature in the mixture of sodium hydroxide solution and sodium silicate solution substantially constant, and continuously separating the crystals formed from the circulating solution.

4. A method of producing crystalline sodium silicate comprising continuously adding a hot sodium silicate solution at an initial temperature above crystallization temperature, which solution does not crystallize at said initial temperature but is supersaturated at crystallization temperature, to a continuously circulating sodium hydroxide solution at crystallization temperature, and maintaining the crystallization temperature in the mixture of sodium hydroxide solution and sodium silicate solution substantially constant, the sodium silicate solution containing anhydrous sodium silicate and water in the same relative proportions as the crystalline substance produced, and continuously separating the crystals formed from the circulating solution.

5. A method of producing crystalline sodium silicate comprising continuously adding a hot sodium silicate solution at an initial temperature above crystallization temperature, which solution does not crystallize at said initial temperature, but is supersaturated at crystallization temperature, to a continuously circulating sodium hydroxide solution at crystallization temperature, and maintaining the crystallization temperature in the mixture of sodium hydroxide solution and sodium silicate solution substantially constant, the sodium silicate solution containing anhydrous sodium silicate and water in the same relative proportions as the crystalline substance produced and the concentrations of both solutions and the crystallizing temperature being adapted to produce a crystalline sodium silicate of predetermined composition.

6. Method of producing crystalline sodium silicate containing nine molecules of water, comprising adding a warm solution of sodium silicate containing nine molecules of water per molecule of sodium silicate to a solution of sodium hydroxide the concentration of said solution of sodium hydroxide being less than 25% of sodium hydroxide and the temperature being about 22° C., substantially maintaining a temperature of about 22° C. in said sodium hydroxide solution, and separating the crystals produced.

7. Method of producing crystalline sodium silicate containing less than nine molecules of water comprising adding a warm solution of sodium silicate containing less than nine molecules of water per molecule of sodium silicate to a solution of sodium hydroxide, the concentration of said solution of sodium hydroxide being in excess of 25% and the temperature being about 22° C., substantially maintaining a temperature of about 22° C. in said sodium hydroxide solution, and separating the crystals produced.

JOSEPH JOHANNES DIEKMANN.